US010725475B2

(12) United States Patent
Yang et al.

(10) Patent No.: US 10,725,475 B2
(45) Date of Patent: Jul. 28, 2020

(54) MACHINE LEARNING ENHANCED VEHICLE MERGING

(71) Applicant: TOYOTA JIDOSHA KABUSHIKI KAISHA, Toyota-shi, Aichi-ken (JP)

(72) Inventors: Hao Yang, Mountain View, CA (US); Rui Guo, Mountain View, CA (US); Kentaro Oguchi, Menlo Park, CA (US); Liu Liu, Mountain View, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 213 days.

(21) Appl. No.: 15/949,067

(22) Filed: Apr. 9, 2018

(65) Prior Publication Data
US 2019/0310648 A1  Oct. 10, 2019

(51) Int. Cl.
G05D 1/02 (2020.01)
G08G 1/0965 (2006.01)
(Continued)

(52) U.S. Cl.
CPC ....... *G05D 1/0221* (2013.01); *B62D 15/0255* (2013.01); *G05D 1/0223* (2013.01);
(Continued)

(58) Field of Classification Search
CPC ...... G05D 1/02; B60R 16/023; H04N 19/513; H04N 5/225; G01C 21/36; G01C 21/32;
(Continued)

(56) References Cited

U.S. PATENT DOCUMENTS 5,761,630 A  6/1998 Sekine et al.
9,002,647 B1 * 4/2015 Sheridan ............ G01C 21/3644
701/533
(Continued)

FOREIGN PATENT DOCUMENTS

CN  109591817 A  * 4/2019  ........... B60R 16/023
JP  11053685 A  2/1999

OTHER PUBLICATIONS

Xie et al., "Collaborative Merging Behaviors and Their Iimpacts on Freeway Ramp Operations Under Connected Vehicle Environment," Sep. 2015, Transportation Research Circular, No. E-C197 (19 pages).
(Continued)

Primary Examiner — Yuri Kan
(74) Attorney, Agent, or Firm — Patent Law Works LLP

(57) ABSTRACT

A method receives a first image set depicting a merging zone, the first image set including first image(s) associated with a first timestamp; determines, using a trained first machine learning logic, a first state describing a traffic condition of the merging zone at the first timestamp using the first image set; determines, from a sequence of states describing the traffic condition of the merging zone at a sequence of timestamps, using a trained second machine learning logic, second state(s) associated with second timestamp(s) prior to the first timestamp of the first state using a trained backward time distance; computes, using a trained third machine learning logic, impact metric(s) for merging action(s) using the first state, the second state(s), and the merging action(s); selects, from the merging action(s), a first merging action based on the impact metric(s); and provides a merging instruction including the first merging action to a merging vehicle.

16 Claims, 8 Drawing Sheets

(51) Int. Cl.
*E06B 9/08* (2006.01)
*G01C 21/32* (2006.01)
*G01C 21/36* (2006.01)
*G06K 9/00* (2006.01)
*G06T 7/70* (2017.01)
*G08G 1/16* (2006.01)
*B62D 15/02* (2006.01)
*G06N 20/00* (2019.01)

(52) U.S. Cl.
CPC ....... *G05D 1/0246* (2013.01); *G06K 9/00798* (2013.01); *G06K 9/00805* (2013.01); *G06N 20/00* (2019.01); *G06T 7/70* (2017.01); *G08G 1/167* (2013.01); *G05D 2201/0213* (2013.01); *G06T 2207/20081* (2013.01); *G06T 2207/30256* (2013.01)

(58) Field of Classification Search
CPC .......... G06K 9/00; G08G 1/0965; G06F 7/00; E06B 9/08
See application file for complete search history.

(56) References Cited

U.S. PATENT DOCUMENTS

| | | | |
|---|---|---|---|
| 9,738,280 B2 | 8/2017 | Rayes | |
| 2002/0170685 A1* | 11/2002 | Weik, III | E05F 1/006 160/133 |
| 2008/0166023 A1* | 7/2008 | Wang | G08G 1/054 382/107 |
| 2010/0225738 A1* | 9/2010 | Webster | B60R 11/04 348/36 |
| 2011/0060496 A1* | 3/2011 | Nielsen | G06Q 10/0631 701/31.4 |
| 2012/0306664 A1* | 12/2012 | Geter | G08G 1/166 340/903 |
| 2016/0191945 A1* | 6/2016 | Gurbuz | H04N 19/521 375/240.15 |
| 2017/0061222 A1* | 3/2017 | Hoye | G06K 9/00845 |
| 2019/0271555 A1* | 9/2019 | Sheridan | G01C 21/3647 |

OTHER PUBLICATIONS

Wang et al., "Formulation of Deep Reinforcement Learning Architecture Toward Autonomous Driving for On-Ramp Merge," 2017 (6 pages).

Rios-Torres et al., "Automated and Cooperative Vehicle Merging at Highway On-Ramps," Apr. 2017, IEEE TRansactions on Intelligent Transportation Systems (10 pages).

Das, "Introduction to Q-Learning—Towards Data Science," Mar. 13, 2017, retrieved from https://towardsdatascience.com/introduction-to-q-learning-88d1c4f2b49c, 8 pgs.

Hinion, "Lecture 10: Recurrent neural networks," University of Toronto—Department of Computer Science, 2013, retrieved from https://www.cs.toronto.edu/~hinton/csc2535/notes/lec10new.pdf, 57 pgs.

Juliani, "Simple Reinforcement Learning with Tensorflow Part 6: Partial Observability and Deep Recurrent Q-Networks," Oct. 7, 2016, retrieved from https://medium.com/emergent-future/simple-reinforcement-learning-with-tensorflow-part-6-partial-observability-and-deep-recurrent-q-68463e9aeefc, 12 pgs.

Li et al., "Lecture 14: Reinforcement Learning," Stanford University, May 23, 2017, 103 pgs.

Pant, "A Guide for Time Series Prediction Using Recurrent Neural Networks (LSTMs)," Sep. 7, 2017, retrieved from https://blog.statsbot.co/time-series-prediction-using-recurrent-neural-networks-lstms-807fa6c.a7f, 16 pgs.

Shaikh, "Getting ready for AI based gaming agents—Overview of Open Source Reinforcement Learning Platforms," Dec. 15, 2016, retrieved from https://www.analyticsvidhya.com/blog/2016/12/getting-ready-for-ai-based-gaming-agents-overview-of-open-sorce-reinforcement-learning-platforms/, 5 pgs.

Shaikh, "Simple Beginner's guide to Reinforcement Learning & its implementation," Jan. 19, 2017, retrieved from https://www.analyticsvidhya.com/blog/2017/01/introduction-to-reinforcement-learning-implementation/, 5 pgs.

* cited by examiner

MACHINE LEARNING ENHANCED VEHICLE MERGING

BACKGROUND

The present disclosure relates to vehicle navigation, and in a more particular example, enhanced vehicle lane merging.

Merging onto freeway is a complicated driving task and often requires cooperation between merging vehicles on the on-ramp and the mainline vehicles on the freeway. It is challenging to regulate merging behaviors of the merging vehicles so that these merging vehicles can merge onto the freeway safely with minimum delay, without interrupting or degrading the flow of freeway traffic. Today, some modern systems rely on vehicle movement monitoring to facilitate the merging behaviors of the merging vehicles. However, these system are generally incapable of improving merging performance of the merging vehicles while limiting the impact of their merging behaviors on flow performance of the mainline traffic. In addition, these existing techniques often require the merging vehicles and the mainline vehicles to be able to communicate with and conform to the control of the systems. Therefore, it is typically impossible for these systems to operate when one or more vehicles travelling on the roads are not provided with these abilities.

SUMMARY

The subject matter described in this disclosure overcomes the deficiencies and limitations of the existing solutions by providing novel technology for determining optimal merging maneuvers for merging vehicles to merge into mainline traffic.

According to one innovative aspect of the subject matter described in this disclosure, a computer-implemented method comprises: receiving a first image set depicting a merging zone, the first image set including one or more first images associated with a first timestamp; determining, using a trained first machine learning logic, a first state describing a traffic condition of the merging zone at the first timestamp using the first image set; determining, from a sequence of states describing the traffic condition of the merging zone at a sequence of timestamps, using a trained second machine learning logic, one or more second states associated with one or more second timestamps prior to the first timestamp of the first state using a trained backward time distance; computing, using a trained third machine learning logic, one or more impact metrics for one or more merging actions using the first state, the one or more second states, and the one or more merging actions; selecting, from the one or more merging actions, a first merging action based on the one or more impact metrics; and providing a merging instruction including the first merging action to a merging vehicle, the merging instruction instructing the merging vehicle to perform the first merging action in the merging zone.

In general, another innovative aspect of the subject matter described in this disclosure may be embodied in computer-implemented methods comprising: retrieving a sequence of states describing a traffic condition of a merging zone at a sequence of timestamps; determining that a first state in the sequence of states indicates a merging action of a first merging vehicle, the first state associated with a first timestamp; determining, from the sequence of states, one or more second states associated with one or more second timestamps prior to the first timestamp of the first state using a backward time distance; determining, from the sequence of states, a third state associated with a third timestamp subsequent to the first timestamp of the first state; receiving a feedback value computed using an impact metric of the merging action and a target impact metric of the merging action, the impact metric of the merging action being determined based on the first state, the one or more second states, and the merging action, the target impact metric of the merging action being determined based on the third state; and adjusting the backward time distance based on the feedback value.

In general, another innovative aspect of the subject matter described in this disclosure may be embodied in systems comprising: one or more processors; one or more memories storing instructions that, when executed by the one or more processors, cause the system to: receive a first image set depicting a merging zone, the first image set including one or more first images associated with a first timestamp; determine, using a trained first machine learning logic, a first state describing a traffic condition of the merging zone at the first timestamp using the first image set; determine, from a sequence of states describing the traffic condition of the merging zone at a sequence of timestamps, using a trained second machine learning logic, one or more second states associated with one or more second timestamps prior to the first timestamp of the first state using a trained backward time distance; compute, using a trained third machine learning logic, one or more impact metrics for one or more merging actions using the first state, the one or more second states, and the one or more merging actions; select, from the one or more merging actions, a first merging action based on the one or more impact metrics; and provide a merging instruction including the first merging action to a merging vehicle, the merging instruction instructing the merging vehicle to perform the first merging action in the merging zone.

In general, another innovative aspect of the subject matter described in this disclosure may be embodied in systems comprising: one or more processors; one or more memories storing instructions that, when executed by the one or more processors, cause the system to: retrieve a sequence of states describing a traffic condition of a merging zone at a sequence of timestamps; determine that a first state in the sequence of states indicates a merging action of a first merging vehicle, the first state associated with a first timestamp; determine, from the sequence of states, one or more second states associated with one or more second timestamps prior to the first timestamp of the first state using a backward time distance; determine, from the sequence of states, a third state associated with a third timestamp subsequent to the first timestamp of the first state; receive a feedback value computed using an impact metric of the merging action and a target impact metric of the merging action, the impact metric of the merging action being determined based on the first state, the one or more second states, and the merging action, the target impact metric of the merging action being determined based on the third state; and adjust the backward time distance based on the feedback value.

These and other implementations may each optionally include one or more of the following features: that the one or more second states includes a plurality of second states, and determining the one or more second states from the sequence of states includes determining a past time range based on the first timestamp of the first state and the trained backward time distance, and determining, from the sequence of states, the plurality of second states associated with a plurality of second timestamps within the past time range;

that the one or more merging actions include one or more speed adjustments to one or more target merging speeds, one or more acceleration adjustments to one or more target acceleration rates, and one or more angle adjustments to one or more target steering angles; that processing, using a control unit of the merging vehicle, the merging instruction including the first merging action, and controlling, using the control unit of the merging vehicle, the merging vehicle to perform the first merging action in the merging zone; that the merging zone includes an on-ramp segment, a upstream freeway segment, and a downstream freeway segment, and the first image set includes the one or more first images associated with the first timestamp received from one or more road side units located in the merging zone, one or more merging vehicles located on the on-ramp segment, one or more upstream mainline vehicles located on the upstream freeway segment, and one or more downstream mainline vehicles located on the downstream freeway segment; that the merging zone includes an on-ramp segment, a upstream freeway segment, and a downstream freeway segment, and determining, using the trained first machine learning logic, each state in the sequence of states associated with a corresponding timestamp in the sequence of timestamps using an image set associated with the corresponding timestamp, and the image set includes one or more images associated with the corresponding timestamp received from one or more road side units located in the merging zone, one or more merging vehicles located on the on-ramp segment, one or more upstream mainline vehicles located on the upstream freeway segment, and one or more downstream mainline vehicles located on the downstream freeway segment; that each state in the sequence of states and the first state includes roadway data describing one or more roadway components of the merging zone, first vehicle movement data of one or more merging vehicles, second vehicle movement data of one or more upstream mainline vehicles, and third vehicle movement data of one or more downstream mainline vehicles, and first segment traffic data of an on-ramp segment, second segment traffic data of a upstream freeway segment, and third segment traffic data of a downstream freeway segment; that the vehicle movement data of each vehicle included in the one or more merging vehicles, the one or more upstream mainline vehicles, and the one or more downstream mainline vehicles specifies one or more of a vehicle location, a vehicle speed, and an acceleration pattern associated with the vehicle, and the segment traffic data of each road segment among the on-ramp segment, the upstream freeway segment, and the downstream freeway segment specifies one or more of a traffic flow, a vehicle density, an average vehicle speed, and an average following distance associated with the road segment.

These and other implementations may each optionally include one or more of the following features: that determining the third state includes determining, from the sequence of states, the third state associated with the third timestamp subsequent to the first timestamp of the first state using a forward time distance, and adjusting the forward time distance based on the feedback value; that determining the third state using the forward time distance includes determining the third timestamp based on the first timestamp of the first state and the forward time distance, and determining, from the sequence of states, the third state associated with the third timestamp; that the impact metric of the merging action is determined based on the first state, the one or more second states, and the merging action using a machine learning logic, and the target impact metric of the merging action is determined based on one or more traffic condition aspects included in the third state, the one or more traffic condition aspects included in the third state comprising first vehicle movement data of one or more merging vehicles and first segment traffic data of an on-ramp segment, second vehicle movement data of one or more upstream mainline vehicles and second segment traffic data of an upstream freeway segment, third vehicle movement data of one or more downstream mainline vehicles and third segment traffic data of a downstream freeway segment, and a merging time amount and a merging point position of the first merging vehicle; that the target impact metric of the merging action is determined based on one or more traffic condition aspects included in the third state and one or more weight values assigned to the one or more traffic condition aspects.

Other implementations of one or more of these and other aspects include corresponding systems, apparatus, and computer programs, configured to perform the actions of methods, encoded on non-transitory computer storage devices.

The novel technology for determining optimal merging maneuvers for merging vehicles presented in this disclosure is particularly advantageous in a number of respects. For example, the technology described herein can learn optimal merging maneuver using the impact metrics of the merging maneuvers. The impact metric of a merging maneuver may indicate the impact of the merging maneuver on the merging vehicles on the on-ramp and the mainline vehicles on the freeway. Accordingly, the present technology can learn the optimal merging maneuvers that improve both merging performance of the merging vehicles and flow performance of the mainline traffic, thereby optimizing the overall performance of the traffic network. As a further example, the present technology only requires captured images of the merging zone as inputs. Therefore, the present technology is advantageously applicable even if the vehicles participating in traffic include non-responsive vehicles. Furthermore, the technology described herein incorporates past traffic conditions of the merging zone and future impact of a merging maneuver into the training process for determining optimal merging maneuvers. Thus, the optimal merging maneuvers can be comprehensively determined.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

The technology described herein can determine optimal merging maneuvers for automatically, efficiently, and safely merging vehicles into mainline traffic. As described in further detail below, the technology includes various aspects, such as vehicle merging methods, systems, computing devices, computer program products, and apparatuses, among other aspects.

An example vehicle merging systems can be trained to determine multiple states describing the traffic condition of a merging zone at various timestamps from captured images, determine one or more states in the sequence of states that are necessary to evaluate the impact of a merging maneuver, and compute the impact metric indicating the impact of the merging maneuver on related traffic and merging performance of the merging vehicle. As a result, in the implementation stage, the trained vehicle merging systems can compute the impact metrics for various merging maneuvers, and determine the optimal merging maneuvers to be performed by the merging vehicle accordingly.

Figure 1:
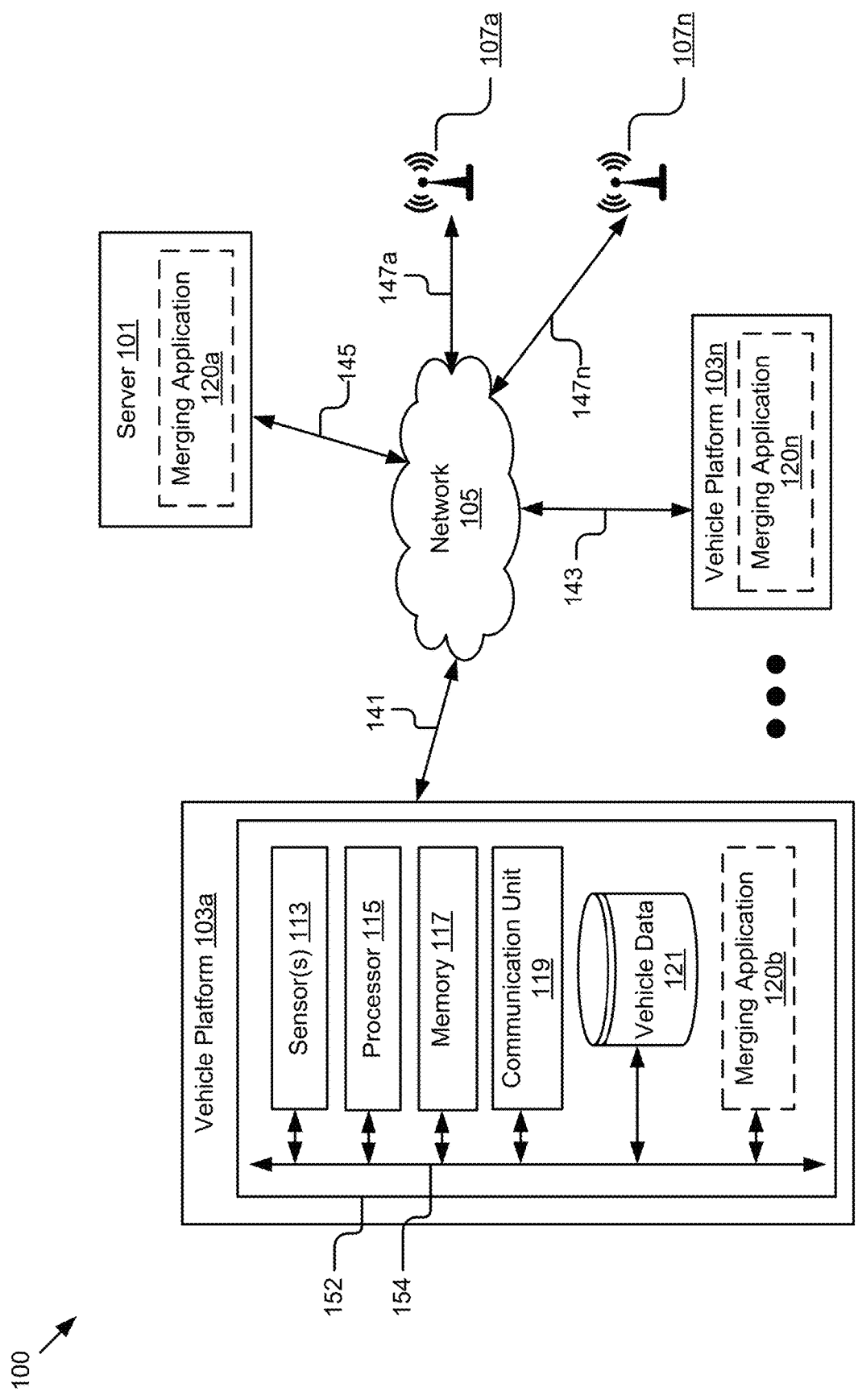
FIG. 1 is a block diagram of an example system for enhanced vehicle merging.

FIG. 1 is a block diagram of an example system 100 for enhanced vehicle merging. As shown, the system 100 includes a server 101, one or more vehicle platforms 103a ... 103n, and one or more roadside unit 107a ... 107n coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, roadside units 107, networks 105, or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates a single block for the network 105 that couples to the server 101 and the vehicle platform(s) 103, it should be understood that the network 105 may in practice comprise any number of combination of networks, as noted above.

The server 101 includes a hardware and/or virtual server that includes a processor, a memory, and network communication capabilities (e.g., a communication unit). The server 101 may be communicatively coupled to the network 105, as reflected by signal line 145. In some embodiments, the server may send and receive data to and from other entities of the system 100, e.g., the vehicle platform(s) 103 and/or the roadside unit(s) 107. As depicted, the server 101 may include an instance 120a of a merging application 120 as further discussed elsewhere herein.

The roadside unit(s) 107a ... 107n include a hardware and/or virtual server that includes a processor, a memory, and network communication capabilities (e.g., a communication unit). The roadside unit(s) 107 may be communicatively coupled to the network 105, as reflected by signal lines 147a ... 147n. In some embodiments, the roadside unit 107(s) may be infrastructure mounted at a high position and/or located on the roadside of various road segments in areas in which vehicles converge, such as a merging zone. A merging zone may comprise a lane that merges with another lane, an intersection where vehicles make right or left hand turns to merge with through traffic, or any other point of convergence where vehicles merge into the same traffic flow. In some embodiments, the roadside unit(s) 107 may include one or more image sensors (e.g., surveillance cameras) configured to capture images of the road segments in the merging zone within their sensor range. In some embodiments, the roadside unit 107 may send the captured images depicting the road segments of the merging zone to other entities of the system 100, e.g., the vehicle platform(s) 103 and/or the server 101.

The vehicle platform(s) 103 include computing device(s) 152 having sensor(s) 113, processor(s) 115, memory(ies) 117, communication unit(s) 119, a vehicle data store 121, and a merging application 120. Examples of computing device(s) 152 may include virtual or physical computer processors, control units, micro-controllers, etc., which are coupled to other components of the vehicle platform(s) 103, such as one or more sensors 113, one or more actuators, one or more motivators, etc. The vehicle platform(s) 103 may be coupled to the network 105 via signal line 141, and may send and receive data to and from other vehicle platform(s) 103, roadside unit(s) 107, and/or the server(s) 101. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data as vehicle operation data in the vehicle data store 121 for access and/or retrieval by the merging application 120. In some implementations, the processor(s) 115 may be capable of generating and providing electronic display signals to input/output device(s), supporting the display of images, capturing and transmitting images, performing complex tasks including various types of traffic condition analysis and machine learning implementation, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or and the vehicle data store 121.

The merging application 120 includes software and/or hardware logic executable to determining optimal merging maneuvers for merging vehicles. As illustrated in FIG. 1, the server 101 and the vehicle platform 103a . . . 103n may include instances 120a and 120b . . . 120n of the merging application 120. In some embodiments, each instance 120a and 120b . . . 120n may comprise one or more components the merging application 120 depicted in FIG. 2, and may be configured to fully or partially perform the functionalities described herein depending on where the instance resides. In some embodiments, the merging application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The merging application 120 may receive and process the sensor data and/or the vehicle data, and communicate with other elements of the vehicle platform 103 via the bus 154, such as the memory 117, the communication unit 119, the vehicle data store 121, and various actuators and/or motivators, etc. For example, the merging application 120 may communicate a merging instruction to one or more steering actuators and one or more speed actuators of the vehicle platform 103 to control the merging maneuvers performed by vehicle platform 103. The merging application 120 is described in details below with reference to at least FIGS. 2-8.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the merging application 120. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other entities of the system 100, such as other vehicle platform(s) 103, roadside unit(s) 107, and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, roadside structures, buildings, static road objects (e.g., lanes, road markings, traffic signs, traffic cones, barricades, etc.), and/or dynamic road objects (e.g., surrounding vehicle platforms 103, road workers, construction vehicles, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR).

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, etc. In some embodiments, the vehicle data may also include multiple road scene images captured by one or more image sensors 113 of the vehicle platform 103 and the image data associated with these images. In some embodiments, the image data may include an image identifier of the image (e.g., image ID), an image data size indicating the data size of the image, an image timestamp indicating date and time when the image is captured, etc.

In some embodiments, the vehicle data store 121 may store a sequence of states associated with a sequence of timestamps for each merging zone. In some embodiments, each state in the sequence of states may describe the traffic condition of the merging zone at the corresponding timestamp in the sequence of timestamps. In some embodiments, the merging zone may include multiple road segments (e.g., on-ramp segment, upstream freeway segment, downstream freeway segment, etc.). For each road segment, the state of the merging zone may include vehicle movement data and segment traffic data describing the traffic condition on that particular road segment at the corresponding timestamp of the state. Non-limiting examples of the vehicle movement data may include, but are not limited to, vehicle location, vehicle speed, acceleration pattern, etc. associated with one or more vehicles located on the road segment. Non-limiting examples of the segment traffic data may include, but are not limited to, traffic flow, vehicle density, average vehicle speed, average following distance, etc. associated with the road segment. In some embodiments, the state may also include roadway data describing the roadway components of the merging zone. For example, the roadway data may include number of lanes, status of lane (e.g., closed lane, open lane, etc.), shape and length, roadway structure, etc. associated with each road segment. In some embodiments, the state may also include a merging time amount and a merging point position associated with each merging vehicle that completes the merging performance to merge from the on-ramp segment to the freeway segment at the corresponding timestamp of the state. In some embodiments, the state may also include the corresponding timestamp of the state, the image IDs of one or more images from which the state is determined, etc. Other types of state data are also possible and contemplated.

In some embodiments, the vehicle data store 121 may store learning/training data of the merging application 120. In some embodiments, the merging application 120 may perform supervised learning in which the training data includes classified, labeled features, although other variations are also possible and contemplated. In some embodiments, the learning data may comprise variables that are back-propagated. Numerous other variations are also possible and contemplated.

In some embodiments, the learning data of the merging application 120 may include backward time distance, forward time distance, impact metric function, etc. In some embodiments, the backward time distance may specify the time distance prior to a merging action (e.g., a merging maneuver) within which the states of the merging zone may be necessary to evaluate the impact of the merging action. The forward time distance may specify the time distance subsequent to the merging action within which one or more states of the merging zone may reflect the impact of the merging action. In some embodiments, the impact metric function may specify the relationship between the merging action performed by the merging vehicle at a particular timestamp, the state of the merging zone at the particular timestamp, and the impact metric of the merging action. Thus, the impact metric function may be used to compute the impact metric of a merging action if the merging action is performed by a merging vehicle given the state of the merging zone at the particular timestamp. In some embodiments, the impact metric of the merging action may indicate the impact of the merging action on the traffic condition of the road segments in the merging zone and the merging performance of the merging vehicle. Other types of learning data are also possible and contemplated.

In some embodiments, the vehicle data store 121 may store a merging action database that includes multiple merging maneuvers potentially performed by the merging vehicles. In this present disclosure, the merging maneuvers may be referred to as the merging actions. Non-limiting examples of the merging actions may include, but are not limited to, one or more speed adjustments to one or more target merging speeds (e.g., adjusting vehicle speed to 25 m/s, adjusting vehicle speed to 30 m/s, etc.), one or more acceleration adjustments to one or more target acceleration rates (e.g., adjusting acceleration rate to 5 m/s$^2$, adjusting acceleration rate to 10 m/s$^2$, etc.), one or more angle adjustments to one or more target steering angles (e.g., adjusting steering angle to 20°, adjusting steering angle to 35°, etc.), etc. Other types of merging actions are also possible and contemplated.

In some embodiments, the vehicle data store 121 may be part of a data storage system (e.g., a standard data or database management system) for storing and providing access to data. Other types of data stored in the vehicle data store 121 are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
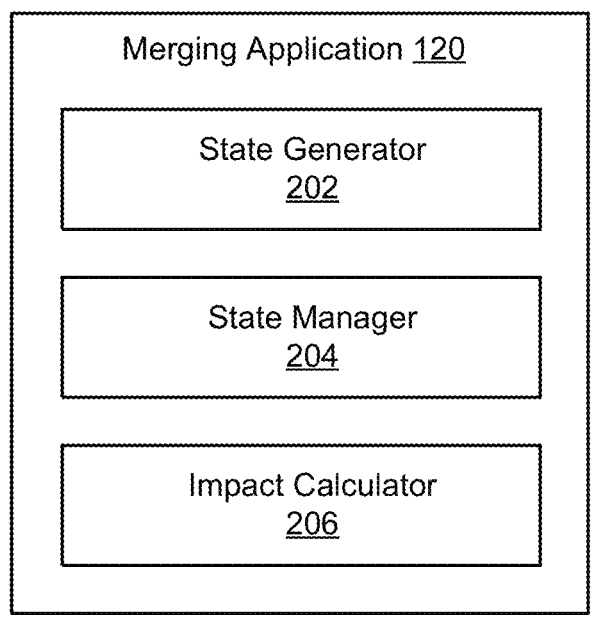
FIG. 2 is a block diagram of an example merging application.

FIG. 2 is a block diagram of an example merging application 120. As depicted, the merging application 120 may include a state generator 202, a state manager 204, and an impact calculator 206, although it should be understood that the merging application 120 may include additional components such as, but not limited to, a configuration engine, other training engines, an encryption/decryption engine, etc., and/or these various components may be combined into a single engine or divided into additional engines.

The state generator 202, the state manager 204, and the impact calculator 206 may be implemented as software, hardware, or a combination of the foregoing. In some embodiments, the state generator 202, the state manager 204, and the impact calculator 206 may be communicatively coupled by the bus 154 and/or the processor 115 to one another and/or the other components of the computing device 152. In some embodiments, one or more of the components 120, 202, 204, and/or 206 are sets of instructions executable by the processor 115 to provide their functionality. In further embodiments, one or more of the 120, 202, 204, and/or 206 are storable in the memory 117 and are accessible and executable by the processor 115 to provide their functionality. In any of the foregoing embodiments, these components 120, 202, 204, and/or 206 may be adapted for cooperation and communication with the processor 115 and other components of the computing device 152. The merging application 120, and its components 202, 204, and 206 are described in further detail below with reference to at least FIGS. 3-8.

Figure 8:
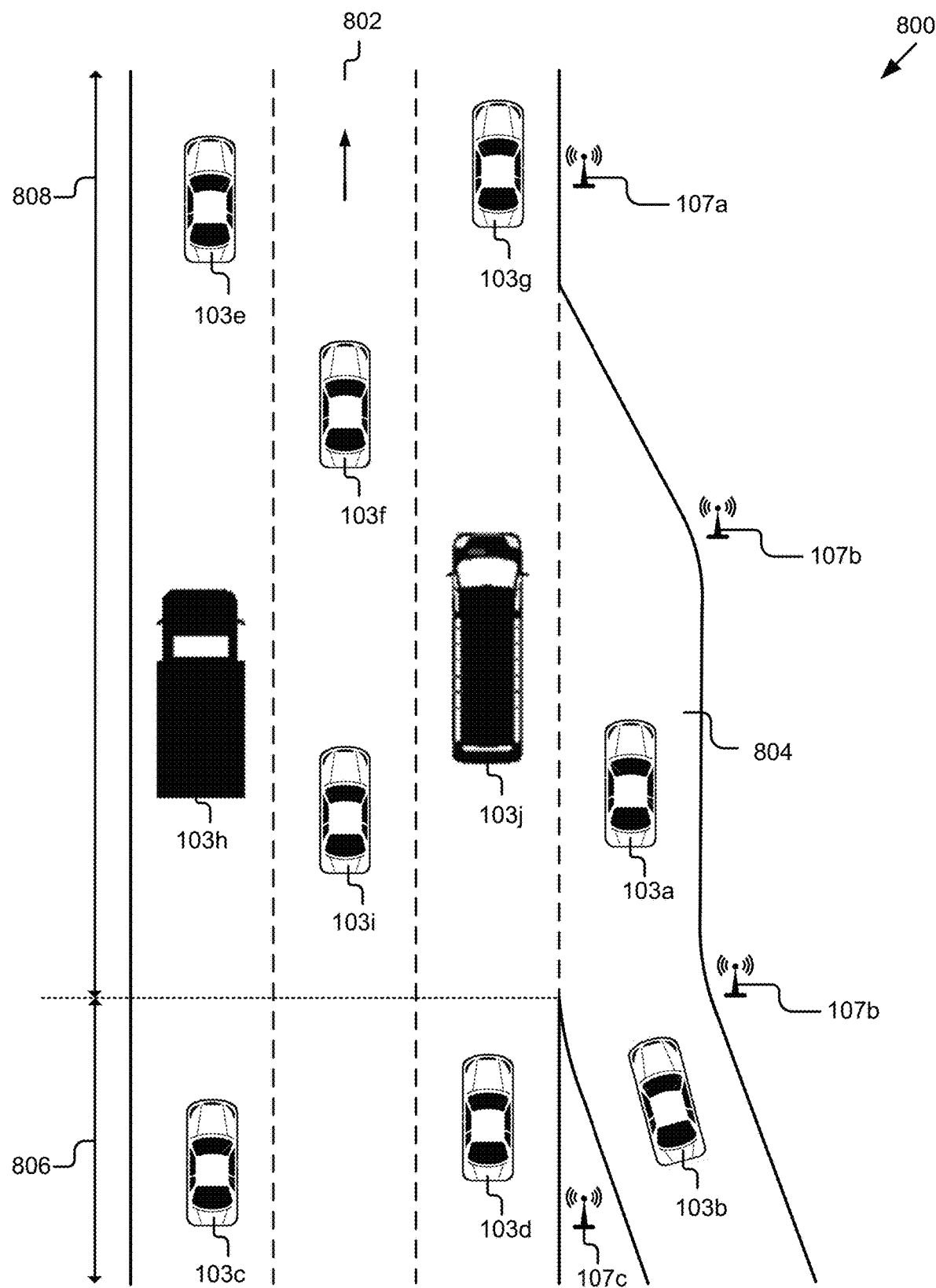
FIG. 8 illustrates an example merging zone.

As discussed elsewhere herein, the merging application 120 includes logic executable to determine optimal merging maneuvers for merging vehicles to merge from the merging road segment to the mainline traffic in the merging zone. As an example, a general merging zone 800 is illustrated in FIG. 8. As depicted, the merging zone may include multiple road segments. In particular, the merging zone 800 may include a freeway segment 802 and an on-ramp segment 804 from which the merging vehicles can enter the freeway segment 802. In some embodiments, the freeway segment 802 may include an upstream freeway segment 806 and a downstream freeway segment 808, the traffic condition of the upstream freeway segment 806 and the downstream freeway segment 808 may be affected by the merging actions of the merging vehicles on the on-ramp segment 804. In some embodiments, the upstream freeway segment 806 may locate upstream to the on-ramp segment 804 in the moving direction of the traffic flow on the freeway segment 802, while the downstream freeway segment 808 may locate corresponding to and/or downstream to the on-ramp segment 804 in such moving direction. As shown, the on-ramp segment 804, the upstream freeway segment 806, and the downstream freeway segment 808 may be provided with multiple roadside units 107 located along their roadway and capturing images of the corresponding traffic.

In some embodiments, multiple vehicle platforms 103 may travel on the road segments of the merging zone at a particular timestamp. The vehicle platforms 103 present in the merging zone at the particular timestamp may include one or more merging vehicles located on the on-ramp segment, one or more upstream mainline vehicles located on the upstream freeway segment, and one or more downstream mainline vehicles located on the downstream freeway segment. As depicted in FIG. 8, the merging vehicles may include the vehicle platforms 103*a* and 103*b* located on the on-ramp segment 804, the upstream mainline vehicles may include the vehicle platforms 103*c* and 103*d* located on the upstream freeway segment 806, and the downstream mainline vehicles may include the vehicle platforms 103*e* . . . 103*j* located on the downstream freeway segment 808.

Figure 3:
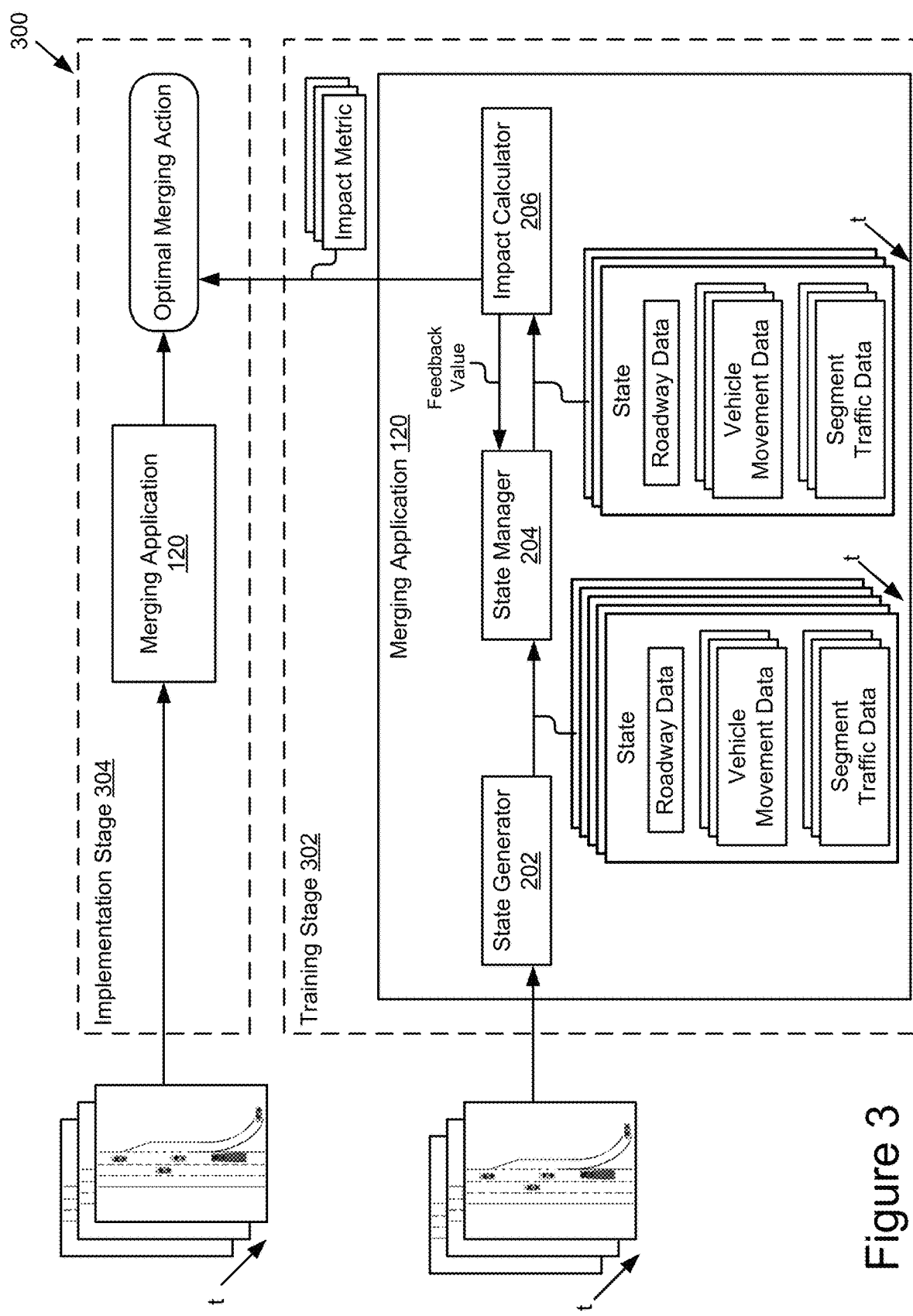
FIG. 3 is a block diagram of an example training stage and an example implementation stage of the merging application.

In some embodiments, the merging application 120 may be subjected to a training process before it is implemented to determine optimal merging maneuvers for merging vehicles. FIG. 3 illustrates a block diagram 300 of an example training stage and an example implementation stage of the merging application 120. As depicted, in the training stage 302, the state generator 202 may learn to determine states of the merging zone from captured images of the merging zone. In some embodiments, each state of the merging zone may be associated with a corresponding timestamp and may describe the traffic condition of the merging zone at the corresponding timestamp. As the images of the merging zone may be continuously captured and sequentially provided to the merging application 120, the state generator 202 may determine a sequence of states describing the traffic condition of the merging zone at a sequence of timestamps.

As depicted in FIG. 3, in the training stage 302, the state manager 204 may learn to determine one or more states relevant to a merging action from the sequence of states. In particular, the state manager 204 may learn to determine one or more backward states in the sequence of states that are necessary to evaluate the impact of a merging action, and one or more forward states in the sequence of states that reflect the impact of the merging action. In some embodiments, the state manager 204 may learn the backward time distance for determining the backward states and the forward time distance for determining the forward states. As depicted in FIG. 3, also in the training stage 302, the impact calculator 206 may learn the impact metric function that can be used to compute the impact metric of a merging action if the merging action is performed by a merging vehicle given a state of the merging zone. In some embodiments, the impact calculator 206 may generate a feedback value from an impact metric of the merging action and a target impact metric of the merging action. The feedback value may be used for the impact calculator 206 to learn the impact metric function, and for the state manager 204 to learn the backward time distance and the forward time distance to determine the relevant states.

In some embodiments, once the training process is completed, the state generator 202, the state manager 204, and the impact calculator 206 may perform their corresponding functionalities to determine optimal merging actions for merging vehicles. In particular, in the implementation stage 304, the state generator 202 may determine a first state of the merging zone at a first timestamp using a first image set. The state manager 204 may determine from the sequence of states of the merging zone one or more backward states that are necessary to evaluate the impact of a merging action at the first timestamp, e.g., using the trained backward time distance. The impact calculator 206 may compute the impact metrics for various merging actions based on the first state, the one or more backward states, and the corresponding merging action using the trained impact metric function. The impact calculator 206 may then select an optimal merging action from the various merging actions based on the impact metrics. Thus, the optimal merging action for the merging vehicle can be determined with the only input being the first image set, as depicted in FIG. 3.

The state generator 202, the state manager 204, and the impact calculator 206 are described in further detail below with reference to at least FIGS. 4-7.

In some embodiments, the state generator 202 may be a machine learning logic being trained to determine one or more states describing the traffic condition of the merging zone from captured images of the merging zone as discussed elsewhere herein. In some embodiments, the state generator 202 may be implemented in the form of a convolutional neural network, a support vector machine, etc. Other system architectures for implementing machine learning logic with various types of supervised learning algorithm and/or unsupervised learning algorithm are also possible and contemplated.

Figure 7:
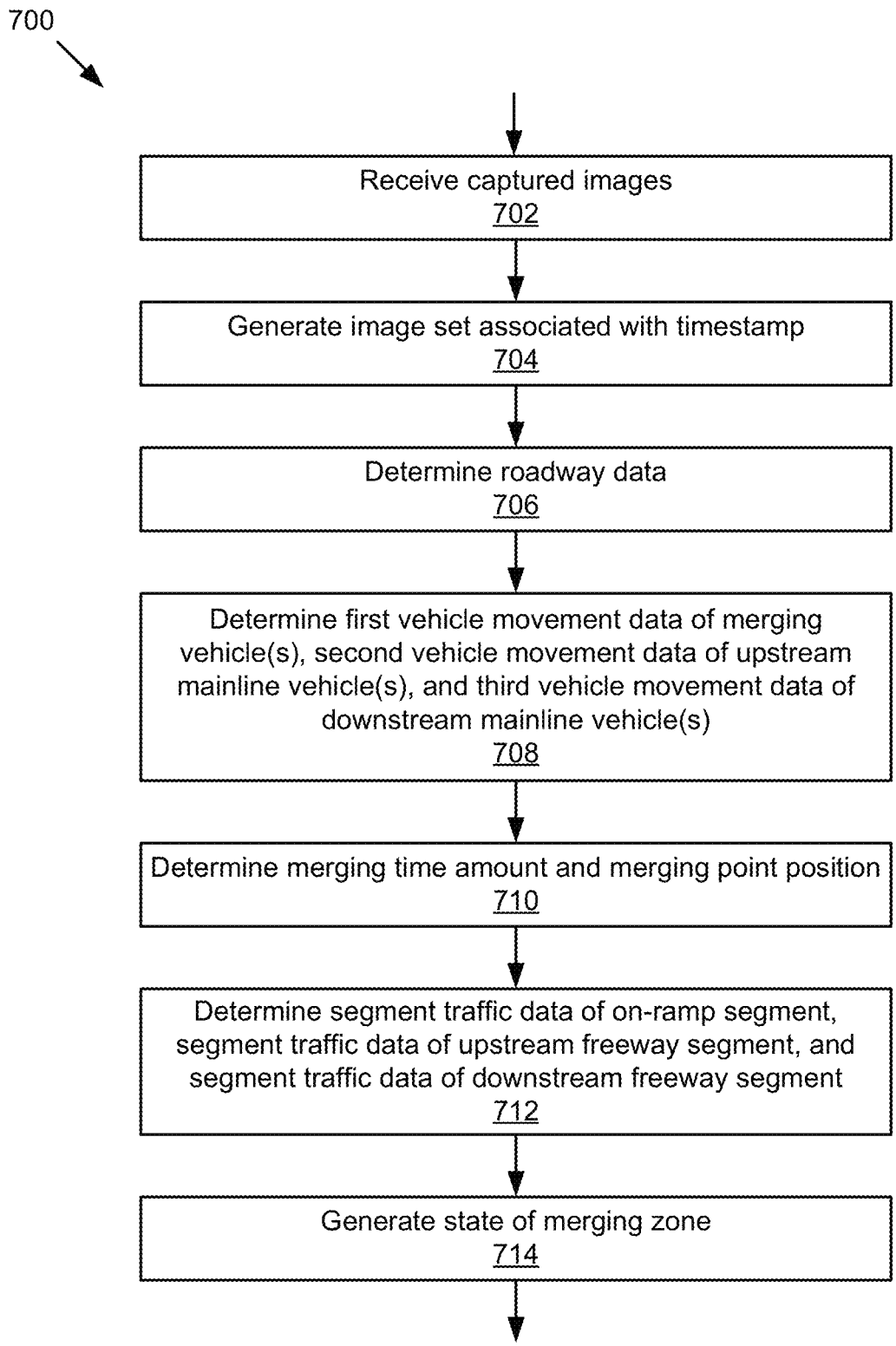
FIG. 7 is a flowchart of an example method for determining states of a merging zone from captured images of the merging zone.

By way of illustration, FIG. 7 is a flowchart of an example method 700 for determining states of the merging zone from captured images of the merging zone. In block 702, the state generator 202 may receive captured images of the merging zone from the roadside units 107 and the vehicle platforms 103 located on various road segments of the merging zone. In some embodiments, the image sensors 113 of the vehicle platforms 103 located in the merging zone may capture images of the merging zone as the vehicle platforms 103 travel along its road segments, and the image sensors of the roadside units 107 located in the merging zone may capture images of the merging zone within their sensor range. In some embodiments, these images may be captured at a predefined rate/interval (e.g., every 1 seconds, every 3 s, etc.) and may be sequentially transmitted to the merging application 120 according to their image timestamps. Thus, the state generator 202 may receive the captured images depicting various road segments of the merging zone at sequential timestamps from the roadside units 107 and the vehicle platforms 103 located in the merging zone. As discussed elsewhere herein, the vehicle platforms 103 located in the merging zone may include one or more merging vehicles located on the on-ramp segment, one or more upstream mainline vehicles located on the upstream freeway segment, and one or more downstream mainline vehicles located on the downstream freeway segment.

In block 704, the state generator 202 may generate one or more image sets, each image set may be associated with a timestamp. In some embodiments, the state generator 202 may aggregate the captured images received from the roadside units 107 and the vehicle platforms 103 based on the image timestamps of the captured images, and determine the timestamp of each image set to be the image timestamp of the captured images included in the image set. As a result, the state generator 202 may generate a sequence of image sets associated with a sequence of timestamps, each image set may include one or more images captured at a corresponding timestamp in the sequence of timestamps and depicting traffic condition on various road segments of the merging zone at the corresponding timestamp.

In some embodiments, for any first image set in the sequence of image sets associated with a first timestamp in the sequence of timestamps, the state generator 202 may determine a first state describing the traffic condition of the merging zone at the first timestamp using the first image set. In particular, the state generator 202 may analyze the captured images associated with the first timestamp in the first image set and/or the captured images associated with other timestamps in other image sets to determine various traffic condition aspects, these traffic condition aspects may describe the traffic condition on various road segments of the merging zone at the first timestamp.

In particular, in block 706, the state generator 202 may determine roadway data describing one or more roadway components of the merging zone. In some embodiments, the roadway components of the merging zone may include the on-ramp segment, the upstream freeway segment, and the downstream freeway segment. For each road segment of the merging zone, the roadway data may include the number of lanes, the status of each lane (e.g., express lane, open lane, closed lane, etc.), the shape and length, the roadway structure, etc. associated with the road segment. In some embodiments, the roadway data may be learned over time from the captured images associated with the first timestamp in the first image set and the captured images associated with other timestamps in other image sets. As an example, for the merging zone 800 depicted in FIG. 8, the state generator 202 may learn that the on-ramp segment 804 has 1 lane with a segment length of 400 m and forms an angle of 35° to the freeway segment 802. The state generator 202 may also learn that the freeway segment 802 includes 3 open lanes, with the upstream freeway segment 806 and the downstream freeway segment 808 on which the traffic condition is likely affected by the merging actions of the merging vehicles on the on-ramp segment 804. In this example, the state generator 202 may learn the segment length of the upstream freeway segment 806 to be 750 m and the segment length of the downstream freeway segment 808 to be 450 m.

In block 708, the state generator 202 may determine first vehicle movement data of one or more merging vehicles located on the on-ramp segment, second vehicle movement data of one or more upstream mainline vehicles located on the upstream freeway segment, and third vehicle movement data of one or more downstream mainline vehicles located on the downstream freeway segment. In some embodiments, the vehicle movement data of each vehicle platform 103 included in the merging vehicles, the upstream mainline vehicles, and the downstream mainline vehicles may describe the vehicle movement of the vehicle platform 103 and may specify the vehicle location, the vehicle speed, and/or the acceleration pattern, etc. associated with the vehicle platform 103. In some embodiments, the state generator 202 may analyze the captured images associated with the first timestamp in the first image set and the captured images associated with other timestamps in other image sets to determine the vehicle movement data of each vehicle platform 103 at the first timestamp. For example, to determine the vehicle location (e.g., geographic coordinates) of the vehicle platform 103 at the first timestamp, the state generator 202 may determine the relative position of the vehicle platform 103 to a reference point having predetermined geographic coordinates (e.g., GPS coordinates). In some embodiments, the state generator 202 may monitor the vehicle location of the vehicle platform 103 in multiple captured images associated with multiple timestamps to determine the vehicle speed (e.g., 27 m/s), the speed variation rate (e.g., ±2 m/s), and the acceleration/deceleration pattern of the vehicle platform 103 at the first timestamp.

In block 710, the state generator 202 may determine the merging time amount and the merging point position of one or more merging vehicles that complete the merging performance at the first timestamp. In some embodiments, the merging time amount and the merging point position of these vehicle platforms 103 may be determined based on the roadway data of the on-ramp segment (e.g., the shape and length, etc.) and the first vehicle movement data of the vehicle platforms 103 located on the on-ramp segment (e.g., the vehicle location, etc.). In particular, the state generator 202 may monitor the vehicle location of the vehicle platform 103 located on the on-ramp segment to determine whether the vehicle platform 103 leaves the on-ramp segment and enters the freeway segment at the first timestamp. If the vehicle platform 103 enters the freeway segment at the first timestamp, the state generator 202 may determine that the vehicle platform 103 completes the merging performance, and determine the vehicle location of the vehicle platform 103 at the first timestamp to be the merging point. In some embodiments, the state generator 202 may determine the merging time amount of the vehicle platform 103 to be the amount of time during which the vehicle platform 103 stays on the on-ramp segment to complete the merging performance (e.g., 45 s). In some embodiments, the state generator 202 may determine the merging point position of the vehicle platform 103 to be the position of the merging point relative to the on-ramp segment (e.g., 300/400 m).

In block 712, the state generator 202 may determine first segment traffic data of the on-ramp segment, second segment traffic data of the upstream freeway segment, and third segment traffic data of the downstream freeway segment. In some embodiments, the segment traffic data of each road segment among the on-ramp segment, the upstream freeway segment, and the downstream freeway segment may describe the traffic condition on the road segment and may specify the traffic flow, the vehicle density, the average vehicle speed, and/or the average following distance, etc. associated with the road segment. In some embodiments, the state generator 202 may determine the segment traffic data of each road segment at the first timestamp based on the roadway data of the road segment (e.g., the shape and length of the road segment, etc.) and the vehicle movement data of the vehicle platforms 103 located on the road segment (e.g., the vehicle speed, the vehicle location of the vehicle platforms 103, etc.). In some embodiments, the state generator 202 may monitor the vehicle location and the vehicle speed of multiple vehicle platforms 103 located on each road segment over time to determine the traffic flow (e.g., 3 vehicles/s), the vehicle density (e.g., 2.1 vehicles/100 m/lane), the average vehicle speed (e.g., 30 m/s), and/or the average following distance (e.g., 45 m) associated with the road segment at the first timestamp.

In block 714, the state generator 202 may generate the state of the merging zone based on the roadway data, the vehicle movement data, and the segment traffic data. In particular, to generate the first state describing the traffic condition of the merging zone at the first timestamp, the state generator 202 may aggregate the first timestamp and the roadway data describing various road segments of the merging zone into the first state. The state generator 202 may also aggregate the first vehicle movement data, the second vehicle movement data, and the third vehicle movement data describing the vehicle movement of the merging vehicles, the upstream mainline vehicles, and the downstream mainline vehicles at the first timestamp into the first state. The state generator 202 may also aggregate the merging time amount and the merging point position of the merging vehicles that complete the merging performance at the first timestamp into the first state. The state generator 202 may also aggregate the first segment traffic data, the second segment traffic data, and the third segment traffic data describing the traffic condition on the on-ramp segment, the upstream freeway segment, and the downstream freeway segment at the first timestamp into the first state. Accordingly, the first state may describe various aspects of the traffic condition on each road segment of the merging zone, and thus may comprehensively describe the traffic condition of the merging zone at the first timestamp. In some embodiments, the first state may be generated in the form of a state vector with multiple vector elements specifying the above traffic condition aspects. In some embodiments, the state generator 202 may store the first state in association with the first timestamp in the sequence of states in the vehicle data store 121.

In some embodiments, the state manager 204 may manage the states included in the sequence of states. In some embodiments, the state manager 204 may be a machine learning logic being trained to determine one or more backward states and one or more forward states in the sequence of states that are relevant to a merging action of a merging vehicle as discussed elsewhere herein. In some embodiments, the state manager 204 may be implemented in the form of a recurrent neural network, long short-term memory (LSTM) network, etc. Other system architectures for implementing machine learning logic with various types of reinforcement learning algorithm are also possible and contemplated.

Figure 4:
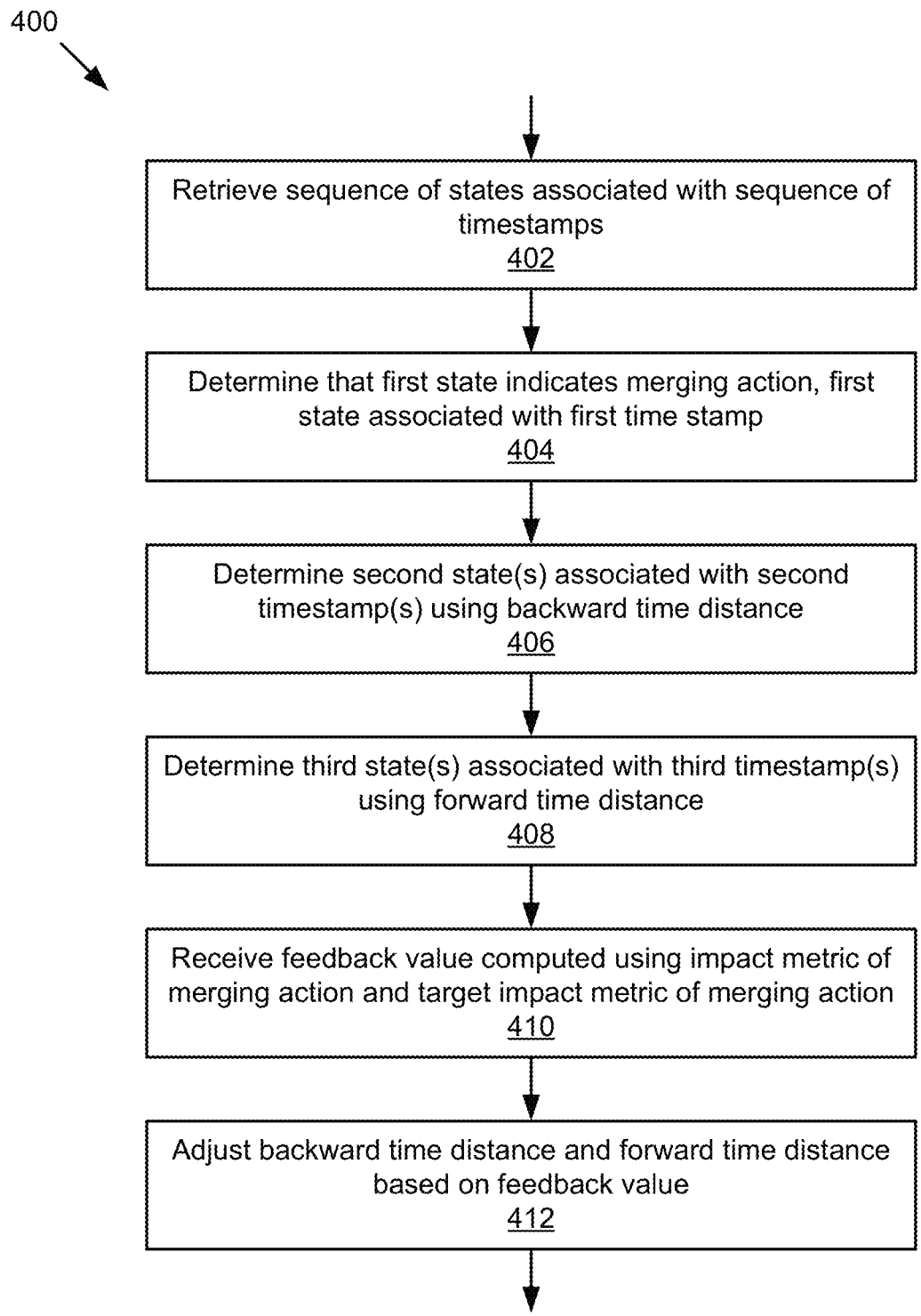
FIG. 4 is a flowchart of an example method for training a state manager of the merging application.

By way of illustration, FIG. 4 is a flowchart of an example method 400 for training the state manager 204 to determine one or more backward states in the sequence of states that are necessary to evaluate the impact of a merging action, and determine one or more forward states in the sequence of states that reflect the impact of the merging action. In block 402, the state manager 204 may retrieve the sequence of states describing the traffic condition of the merging zone at the sequence of timestamps. In some embodiments, the state manager 204 may retrieve the sequence of states of the merging zone from the vehicle data store 121.

Figure 5:
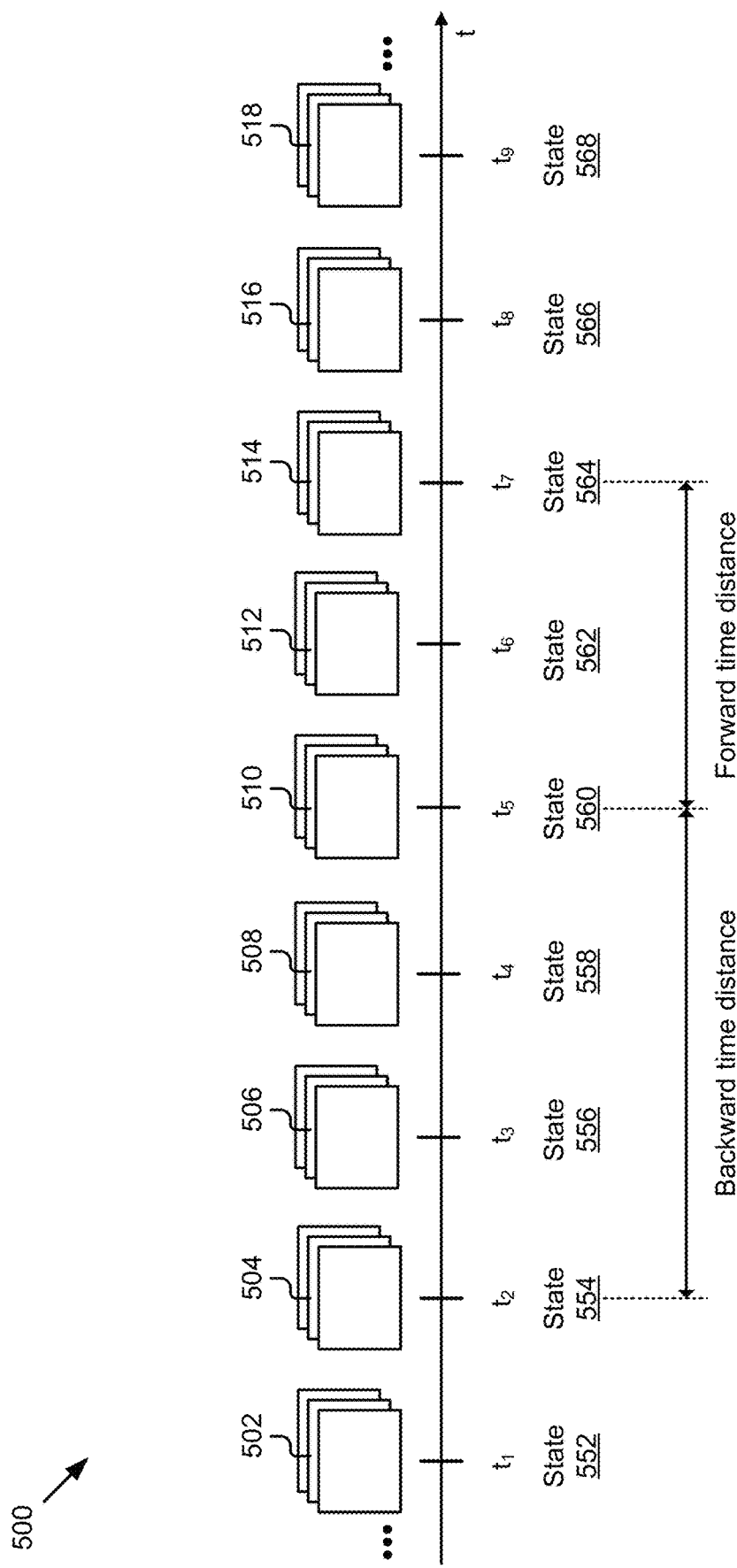
FIG. 5 illustrates an example sequence of states.

As an example, FIG. 5 illustrates a portion of a sequence of states 500 describing the traffic condition of the merging zone 800 depicted in FIG. 8. As shown, the sequence of states 500 may include 9 sequential states 552, 554, 556, 558, 560, 562, 564, 566, and 568 associated with 9 sequential timestamps $t=t_1$, $t=t_2$, $t=t_3$, $t=t_4$, $t=t_5$, $t=t_6$, $t=t_7$, $t=t_8$, and $t=t_9$ in the sequence of timestamps. In this example, assuming that the time interval between 2 sequential timestamps in the sequence of timestamps is 1 s. As described elsewhere herein, each state associated with a corresponding timestamp may be determined from an image set associated with the corresponding timestamp, and may comprehensively describe the traffic condition on various road segments of the merging zone at the corresponding timestamp. In this example, 9 sequential states 552, 554, 556, 558, 560, 562, 564, 566, and 568 may be determined from 9 corresponding image sets 502, 504, 506, 508, 510, 512, 514, 516, and 518, and may comprehensively describe the traffic condition on the on-ramp segment 804, the upstream freeway segment 806, and the downstream freeway segment 808 of the merging zone 800 at 9 corresponding timestamps $t=t_1$, $t=t_2$, $t=t_3$, $t=t_4$, $t=t_5$, $t=t_6$, $t=t_7$, $t=t_8$, and $t=t_9$.

In block 404, the state manager 204 may determine that a first state in the sequence of states indicates a merging action of a first merging vehicle, the first state in the sequence of states may be associated with a first timestamp in the sequence of timestamps. In some embodiments, the state manager 204 may analyze the first vehicle movement data of the merging vehicles included in multiple states and determine that the first state in the sequence of states indicates the merging action of the first merging vehicle. Continuing the above example, the state manager 204 may determine that the state 560 corresponding to the timestamp $t=t_5=14:00:05$ indicates the merging action of the vehicle platform 103a located on the on-ramp segment 804. In this example, the vehicle platform 103a may perform the merging action of adjusting its vehicle speed to the target merging speed of 30 m/s at the timestamp $t=t_5$.

In block 406, the state manager 204 may determine from the sequence of states one or more second states associated with one or more second timestamps prior to the first timestamp of the first state using the backward time distance. As discussed elsewhere herein, the backward time distance may specify the time distance prior to the merging action within which the states of the merging zone may be necessary to evaluate the impact of the merging action. In some embodiments, the state manager 204 may retrieve the backward time distance from the vehicle data store 121. In some embodiments, the state manager 204 may determine a past time range based on the first timestamp of the first state and the backward time distance. In particular, the state manager 204 may determine the upper threshold of the past time range $t_{past\_upper}$=the first timestamp of the first state indicating the merging action. The state manager 204 may determine the lower threshold of the past time range $t_{past\_lower}$=(the first timestamp of the first state–the backward time distance). In some embodiments, the state manager 204 may determine from the sequence of states one or more second states associated with one or more second timestamps within the past time range [$t_{past\_lower}$, $t_{past\_upper}$).

Continuing the above example, the state manager 204 may determine the upper threshold of the past time range to be the timestamp $t=t_5$ of the state 560 indicating the merging action of the vehicle platform 103a (e.g., adjusting the vehicle speed to the target merging speed of 30 m/s). Accordingly, the state manager 204 may determine the upper threshold of the past time range $t_{past\_upper}=t_5=14:00:05$. In this example, assuming that the current value of the backward time distance retrieved from the vehicle data store 121 is 3 s. Accordingly, the state manager 204 may determine the lower threshold of the past time range $t_{past\_lower}$=(the timestamp of the state 560–the backward time distance)=14:00:05−00:00:03=14:00:02. The state manager 204 may then determine the second states associated with the second timestamps within the past time range of [14:00:02, 14:00:05) from the sequence of states 500. In this example, the second states may include the state 554 associated with the timestamp $t=t_2=14:00:02$, the state 556 associated with the timestamp $t=t_3=14:00:03$, and the state 558 associated with the timestamp $t=t_4=14:00:04$. Thus, in this example, the state 554, the state 556, and the state 558 are 3 backward states of the merging zone prior to the state 560 in the sequence of states that are determined as necessary to evaluate the impact of the merging action performed by the vehicle platform 103a in the state 560.

In block 408, the state manager 204 may determine from the sequence of states one or more third states associated with one or more third timestamps subsequent to the first timestamp of the first state using the forward time distance. As discussed elsewhere herein, the forward time distance may specify the time distance subsequent to the merging action within which one or more states of the merging zone may reflect the impact of the merging action. In some embodiments, the state manager 204 may retrieve the forward time distance from the vehicle data store 121. In some embodiments, the state manager 204 may determine a future time range based on the first timestamp of the first state and the forward time distance. In particular, the state manager 204 may determine the lower threshold of the future time range $t_{future\_lower}$=the first timestamp of the first state indicating the merging action. The state manager 204 may determine the upper threshold of the future time range $t_{future\_upper}$=(the first timestamp of the first state+the forward time distance). In some embodiments, the state manager 204 may determine a third timestamp to be $t_{future\_upper}$, and determine one third state associated with the third timestamp from the sequence of states. In some embodiments, the state manager 204 may determine from the sequence of states one or more third states associated with one or more third timestamps within the future time range ($t_{future\_lower}$, $t_{future\_upper}$].

Continuing the above example, the state manager 204 may determine the lower threshold of the future time range to be the timestamp $t=t_5$ of the state 560 indicating the merging action of the vehicle platform 103a. Accordingly, the state manager 204 may determine the lower threshold of the future time range $t_{future\_lower}=t_5=14:00:05$. In this example, assuming that the current value of the forward time distance retrieved from the vehicle data store 121 is 2 s. Accordingly, the state manager 204 may determine the upper threshold of the future time range $t_{future\_upper}$=(the timestamp of the state 560+the forward time distance)=14:00:05+00:00:02=14:00:07. In some embodiments, the state manager 204 may then determine a third timestamp=$t_{future\_upper}$=14:00:07, and determine the third state associated with the third timestamp of 14:00:07 from the sequence of states (e.g., the state 564). In these embodiments, the state 564 is the future state of the merging zone subsequent to the state 560 in the sequence of states that is determined as reflecting the impact of the merging action performed by the vehicle platform 103a in the state 560. In other embodiments, the state manager 204 may determine the third states associated with the third timestamps within the future time range of (14:00:05, 14:00:07] from the sequence of states 500. In this example, the third states may include the state 562 associated with the timestamp $t=t_6=14:00:06$ and the state 564 associated with the timestamp $t=t_7=14:00:07$. In these embodiments, the state 562 and the state 564 are 2 future states of the merging zone subsequent to the state 560 in the sequence of states that are determined as reflecting the impact of the merging action performed by the vehicle platform 103a in the state 560.

In some embodiments, the state manager 204 may provide the first state, the one or more second states, and the one or more third states to the impact calculator 206. In some embodiments, the impact calculator 206 may be a machine learning logic being trained to determine the impact metric for a merging action, the impact metric may indicate the impact of the merging action on the related traffic of the merging zone and the merging performance of the merging vehicle as discussed elsewhere herein. In some embodiments, the impact calculator 206 may be implemented in the form of a Q-learning network, deep Q-learning network, etc. Other system architectures for implementing machine learning logic with various types of reinforcement learning algorithm are also possible and contemplated.

In some embodiments, the impact calculator 206 may receive the first state, the one or more second states, and the one or more third states from the state manager 204 as inputs. As discussed above, the second states may be the backward states of the merging zone determined as necessary to evaluate the impact of the merging action indicated in the first state, and the third states may be the forward states of the merging zone determined as reflecting the impact of the merging action indicated in the first state. In some embodiments, if a plurality of third states are provided to the impact calculator 206, each third state may be individually used for one training cycle of the state manager 204 and the impact calculator 206 discussed below. In some embodiments, the impact calculator 206 may retrieve the first state, the one or more second states, and the one or more third states from the vehicle data store 121.

In some embodiments, the impact calculator 206 may determine the impact metric of the merging action indicated in the first state based on the first state, the one or more second states, and the merging action indicated in the first state. In some embodiments, the impact metric of the merging action may be computed based on the first state, the one or more second states, and the merging action using the impact metric function. As discussed elsewhere herein, the impact metric function may specify the relationship between the merging action performed by the merging vehicle at a particular timestamp, the state of the merging zone at the particular timestamp, and the impact metric of the merging action. In some embodiments, the backward states of the merging zone prior to the particular timestamp may be incorporated into the impact metric function to compute the impact metric. In some embodiments, the impact metric function may include one or more impact parameters to be learned from the training process using the feedback value.

In some embodiments, the impact calculator 206 may determine the target impact metric for the merging action indicated in the first state using a third state included in the one or more third states. In some embodiments, the impact calculator 206 may analyze the third state to determine one or more traffic condition aspects describing the traffic condition of the merging zone included in the third state. The impact calculator 206 may then determine the target impact metric of the merging action indicated in the first state based on the traffic condition aspects included in the third state. For example, in some embodiments, the impact calculator 206 may determine the target impact metric of the merging action indicated in the first state as being directly proportional to the traffic flow of the downstream freeway segment and/or inversely proportional to the vehicle density of the upstream freeway segment included in the third state.

Continuing the above example, the impact calculator 206 may determine the target impact metric for the merging action of the vehicle platform 103a indicated in state 560 associated with the timestamp $t=t_5$ (e.g., adjusting the vehicle speed to the target merging speed of 30 m/s) based on the traffic condition aspects included in the state 564 associated with the timestamp $t=t_7$. As discussed elsewhere herein, the state 564 may include various traffic condition aspects comprehensively describing the traffic condition on various road segments of the merging zone at the timestamp $t=t_7$. In some embodiments, these traffic condition aspects may include the first vehicle movement data of the merging vehicles and the first segment traffic data of the on-ramp segment 804, the second vehicle movement data of the upstream mainline vehicles and the second segment traffic data of the upstream freeway segment 806, and the third vehicle movement data of the downstream mainline vehicles and the third segment traffic data of the downstream freeway segment 808. In some embodiments, if the vehicle platform 103a completes its merging performance at the timestamp $t=t_7$, the traffic condition aspects included in the state 564 may also comprise the merging time amount and the merging point position of the vehicle platform 103a. In this example, the impact calculator 206 may compute the target impact metric for the merging action of the vehicle platform 103a as being directly proportional to the average vehicle speed and the traffic flow of the on-ramp segment 804, the upstream freeway segment 806, and the downstream freeway segment 808. In this example, the target impact metric for the merging action of the vehicle platform 103a may also be inversely proportional to the merging time amount of the vehicle platform 103a and the speed variation rate of the merging vehicles, the upstream mainline vehicles, and the downstream mainline vehicles.

In some embodiments, the impact calculator 206 may assign different weight values to different traffic condition aspects in determining target weight value for the merging action. In the above example, the merging time amount of the vehicle platform 103a may be assigned a higher weight value than the speed variation rate of the upstream mainline vehicles, because the merging time amount of the vehicle platform 103a is more important to evaluate the impact of the merging action than the speed variation rate of the upstream mainline vehicles. In some embodiments, the impact calculator 206 may determine the target impact metric of the merging action indicated in the first state based on the traffic condition aspects included in the third state and the weight values assigned to the traffic condition aspects. In some embodiments, the impact calculator 206 may adjust the weight values assigned to the traffic condition aspects based on the feedback value.

In some embodiments, the impact calculator 206 may compute the feedback value using the impact metric and the target impact metric of the merging action indicated in the first state. As discussed above, the impact metric of the merging action may be determined based on the first state, the one or more second states, and the merging action using the impact metric function. The target impact metric of the merging action may be determined based on a third state included in the one or more third states. In some embodiments, the feedback value may be the squared error between the impact metric of the merging action and the target impact metric of the merging action. In some embodiments, the impact calculator 206 may adjust the impact parameters of the impact metric function based on the feedback value. In some embodiments, the impact calculator 206 may also adjust the weight values assigned to the traffic condition aspects included in the state based on the feedback value. In some embodiments, the impact calculator 206 may store the adjusted impact metric function with the adjusted impact parameters, and/or the adjusted weight values associated with the traffic condition aspects in the vehicle data store 121.

In some embodiments, the impact calculator 206 may provide the feedback value to the state manager 204. Referring back to FIG. 4, in block 410, the state manager 204 may receive the feedback value from the impact calculator 206. As discussed above, the feedback value may be computed using the impact metric and the target impact metric of the merging action indicated in the first state. In block 412, the state manager 204 may adjust the backward time distance and/or the forward time distance based on the feedback value. As discussed elsewhere herein, the backward time distance may specify the time distance prior to a merging action indicated in the first state within which the second states of the merging zone may be necessary to evaluate the impact of the merging action. The forward time distance may specify the time distance subsequent to the merging action indicated in the first state within which one or more third states of the merging zone may reflect the impact of the merging action. In some embodiments, the state manager 204 may store the adjusted backward time distance and the adjusted forward time distance in the vehicle data store 121.

In some embodiments, the impact calculator 206 and/or the state manager 204 may determine whether their learning data (e.g., the impact parameters of the impact metric function, the weight value of the traffic condition aspects included in the state, the backward time distance, the forward time distance, etc.) is sufficiently adjusted. In some embodiments, the impact calculator 206 may determine whether the feedback value satisfies a predefined feedback value threshold. In some embodiments, the impact calculator 206 may determine whether the feedback value remains unchanged for a predefined number of training cycles. Responsive to determining that the feedback value satisfies the predefined feedback value threshold and/or determining that the feedback value remains unchanged for the predefined number of training cycles, the impact calculator 206 may determine that the learning data of the impact calculator 206 and the state manager 204 is sufficiently adjusted. Once the learning data of the impact calculator 206 and the state manager 204 is sufficiently adjusted, the impact calculator 206 may determine that the training process of the impact calculator 206 and the state manager 204 is completed. The learning data of the impact calculator 206 and the state manager 204 may now be considered as trained data (e.g., trained impact metric function, trained weight value of the traffic condition aspects, trained backward time distance, trained forward time distance, etc.), and the impact calculator 206 and the state manager 204 are ready for the implementation stage.

Figure 6:
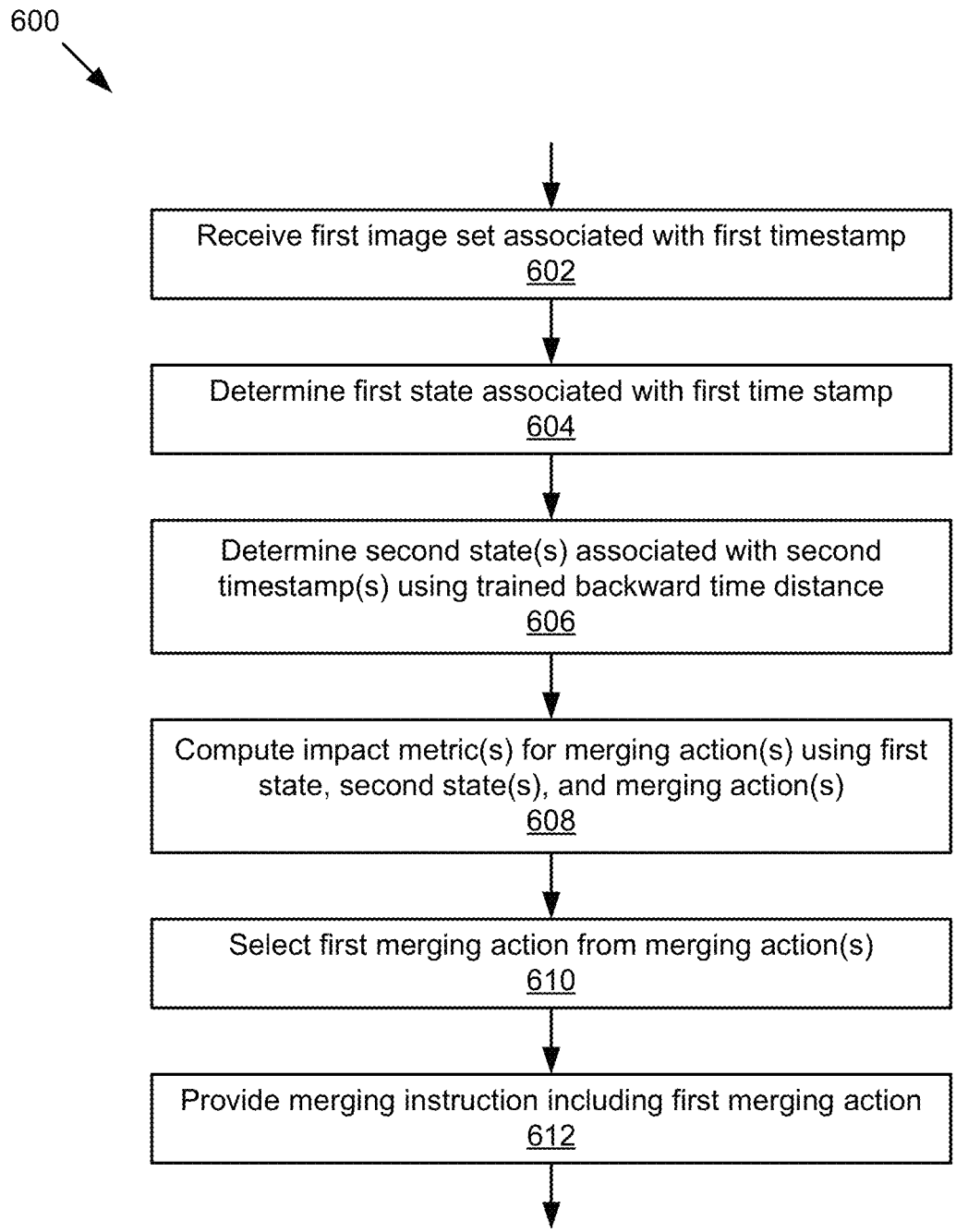
FIG. 6 is a flowchart of an example method for determining an optimal merging maneuver for a merging vehicle.

FIG. 6 is a flowchart of an example method 600 for determining an optimal merging action for a merging vehicle. In some embodiments, the method 600 may be performed by the merging application 120 in the implementation stage. In the implementation stage, the state generator 202, the state manager 204, and the impact calculator 206 may be fully trained. In block 602, the trained state generator 202 may receive a first image set depicting a merging zone. For example, the trained state generator 202 may receive the first image set depicting the merging zone associated with the vehicle location of a merging vehicle at a first timestamp. The first image set may include one or more first images associated with the first timestamp and depicting the traffic condition on various road segments of the merging zone at the first timestamp. As discussed elsewhere herein, the one or more first images may be received from the roadside units 107 located in the merging zone, the merging vehicles located on the on-ramp segment, the upstream mainline vehicles located on the upstream freeway segment, and the downstream mainline vehicles located on the downstream freeway segment.

In block 604, the trained state generator 202 may determine a first state associated with the first timestamp using the first image set. The first state may include various traffic condition aspects describing the traffic condition on various road segments of the merging zone at the first timestamp. In some embodiments, the traffic condition aspects included in the first state may comprise the road segment data describing the road segments of the merging zone, the first vehicle movement data of the merging vehicles and the first segment traffic data of the on-ramp segment, the second vehicle movement data of the upstream mainline vehicles and the second segment traffic data of the upstream freeway segment, and the third vehicle movement data of the downstream mainline vehicles and the third segment traffic data of the downstream freeway segment.

In block 606, the trained state manager 204 may determine, from a sequence of states describing the traffic condition of the merging zone at a sequence of timestamps, one or more second states associated with one or more second timestamps prior to the first timestamp of the first state using the trained backward time distance. In some embodiments, the trained state manager 204 may retrieve the sequence of states of the merging zone from the vehicle data store 121. Each state in the sequence of states may be associated with a corresponding timestamp in the sequence of timestamps, and may be determined using an image set associated with the corresponding timestamp by the trained state generator 202. Similar to the first image set, each image set may include one or more images associated with the corresponding timestamp, the one or more images may be received from the roadside units 107 located in the merging zone, the merging vehicles located on the on-ramp segment, the upstream mainline vehicles located on the upstream freeway segment, and the downstream mainline vehicles located on the downstream freeway segment.

In some embodiments, similar to the first state associated with the first timestamp, each state in the sequence of states may include various traffic condition aspects describing the traffic condition on various road segments of the merging zone at the corresponding timestamp. The traffic condition aspects included in each state may comprise the road segment data describing the road segments of the merging zone, the first vehicle movement data of the merging vehicles and the first segment traffic data of the on-ramp segment, the second vehicle movement data of the upstream mainline vehicles and the second segment traffic data of the upstream freeway segment, and the third vehicle movement data of the downstream mainline vehicles and the third segment traffic data of the downstream freeway segment. The traffic condition aspects included in each state may additionally comprise the merging time amount and the merging point position of the merging vehicles that complete the merging performance at the corresponding timestamp.

In some embodiments, the trained state manager 204 may determine a past time range based on the first timestamp of the first state and the trained backward time distance. In particular, the trained state manager 204 may determine the upper threshold of the past time range $t_{past\_upper}$=the first timestamp of the first state, and the lower threshold of the past time range $t_{past\_lower}$=(the first timestamp of the first state−the trained backward time distance). The trained state manager 204 may then determine one or more second states associated with one or more second timestamps within the past time range $[t_{past\_lower}, t_{past\_upper})$ from the sequence of states. In some embodiments, the one or more second states may include a plurality of second states. Thus, the second states are the backward states of the merging zone prior to the first timestamp of the first state in the sequence of states that are necessary to evaluate the impact of a merging action to be performed by the merging vehicle at the first timestamp.

In block 608, the trained impact calculator 206 may compute one or more impact metric for one or more merging actions using the first state, the one or more second states, and the one or more merging actions. In some embodiments, the trained impact calculator 206 may retrieve the one or more merging actions from the merging action database in the vehicle data store 121. For each merging action in the merging action database (e.g., various speed adjustment to various target merging speeds, various angle adjustments to various target steering angles, etc.), the trained impact calculator 206 may compute the impact metric for the merging action based on the first state, the one or more second states, and the merging action using the trained impact metric function. As discussed elsewhere herein, the impact metric of the merging action may indicate the impact of the merging action on the related traffic of the merging zone (e.g., the speed variation rate of the upstream mainline vehicles, the vehicle density of the downstream freeway segment, etc.) and the merging performance of the merging vehicle (e.g., the merging time amount of the merging vehicle, the merging point position of the merging vehicle, etc.).

In block 610, the trained impact calculator 206 may select a first merging action from the one or more merging actions based on the one or more impact metrics. In some embodiments, the trained impact calculator 206 may select the merging action having the lowest impact metric to be the first merging action. In some embodiments, the trained impact calculator 206 may select the merging action having the highest impact metric to be the first merging action. In some embodiments, the trained impact calculator 206 may determine a subset of merging actions that have the impact metric satisfying a predefined impact metric threshold, and randomly select the first merging action from the subset of merging actions. In some embodiments, the trained impact calculator 206 may select a plurality of first merging actions for the merging vehicle based on the impact metrics. For example, the trained impact calculator 206 may select a merging action of "adjusting the vehicle speed to the target merging speed of 30 m/s" (e.g., 67 mph) and a merging action of "adjusting the steering angle to the target steering angle of 35°" to be the first merging actions for the merging vehicle. In some embodiments, the first merging action(s) may be determined as the optimal merging action(s) to be performed by the merging vehicle to merge into the freeway segment at the first timestamp, given the first state of the merging zone at the first timestamp.

In block 610, the merging application 120 may provide a merging instruction including the first merging action(s) to the merging vehicle, the merging instruction may instruct the merging vehicle to perform the first merging action(s) in the merging zone. In some embodiments, the merging application 120 may generate and display a merging guidance message including the first merging action(s) to the driver via one or more output devices of the merging vehicle. For example, the merging application 120 may display a dynamic graphical map representing the vehicle location of the merging vehicle relative to the on-ramp segment and the merging guidance message (e.g., "adjusting vehicle speed to 67 mph and adjusting the steering angle to 35°") on a touch screen of the merging vehicle. In another example, the merging guidance message may be provided in the form of a voice instruction for the driver to follow and perform the merge accordingly.

In some embodiments, the merging application 120 may communicate the merging instruction including the first merging action(s) to a control unit (e.g., the ECU) of the merging vehicle. In some embodiments, the control unit of the merging vehicle may process the merging instruction of the merging application 120 and control the merging vehicle to perform the merging action in the merging zone. For example, the control unit may actuate the speed actuators and the steering actuators of the merging vehicle to automatically adjust the vehicle speed of the merging vehicle to 67 mph and adjust the steering angle of the merging vehicle to 35° according to the merging instruction. As a result, the merging vehicle may automatically perform the first merging actions determined as optimal merging actions given the first state of the merging zone at the first timestamp, thereby automatically merging from the on-ramp segment to the freeway segment without human intervention.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   receiving a first image set depicting a merging zone, the first image set including one or more first images associated with a first timestamp;
   determining, using a trained first machine learning logic, a first state describing a traffic condition of the merging zone at the first timestamp using the first image set;
   determining, from a sequence of states describing the traffic condition of the merging zone at a sequence of timestamps, using a trained second machine learning logic, one or more second states associated with one or more second timestamps prior to the first timestamp of the first state using a trained backward time distance;
   computing, using a trained third machine learning logic, one or more impact metrics for one or more merging actions using the first state, the one or more second states, and the one or more merging actions;
   selecting, from the one or more merging actions, a first merging action based on the one or more impact metrics; and
   providing a merging instruction including the first merging action to a merging vehicle, the merging instruction instructing the merging vehicle to perform the first merging action in the merging zone.

2. The method of claim 1, wherein the one or more second states includes a plurality of second states, and determining the one or more second states from the sequence of states includes:
   determining a past time range based on the first timestamp of the first state and the trained backward time distance; and
   determining, from the sequence of states, the plurality of second states associated with a plurality of second timestamps within the past time range.

3. The method of claim 1, wherein the one or more merging actions include one or more speed adjustments to one or more target merging speeds, one or more acceleration adjustments to one or more target acceleration rates, and one or more angle adjustments to one or more target steering angles.

4. The method of claim 1, further comprising:
   processing, using a control unit of the merging vehicle, the merging instruction including the first merging action; and
   controlling, using the control unit of the merging vehicle, the merging vehicle to perform the first merging action in the merging zone.

5. The method of claim 1, wherein
   the merging zone includes an on-ramp segment, a upstream freeway segment, and a downstream freeway segment, and
   the first image set includes the one or more first images associated with the first timestamp received from one or more road side units located in the merging zone, one or more merging vehicles located on the on-ramp segment, one or more upstream mainline vehicles located on the upstream freeway segment, and one or more downstream mainline vehicles located on the downstream freeway segment.

6. The method of claim 1, wherein the merging zone includes an on-ramp segment, a upstream freeway segment, and a downstream freeway segment, the method includes:
   determining, using the trained first machine learning logic, each state in the sequence of states associated with a corresponding timestamp in the sequence of timestamps using an image set associated with the corresponding timestamp; and wherein
   the image set includes one or more images associated with the corresponding timestamp received from one or more road side units located in the merging zone, one or more merging vehicles located on the on-ramp segment, one or more upstream mainline vehicles located on the upstream freeway segment, and one or more downstream mainline vehicles located on the downstream freeway segment.

7. The method of claim 1, wherein each state in the sequence of states and the first state includes
   roadway data describing one or more roadway components of the merging zone, first vehicle movement data of one or more merging vehicles, second vehicle movement data of one or more upstream mainline vehicles, and third vehicle movement data of one or more downstream mainline vehicles, and first segment traffic data of an on-ramp segment, second segment traffic data of a upstream freeway segment, and third segment traffic data of a downstream freeway segment.

8. The method of claim 7, wherein the vehicle movement data of each vehicle included in the one or more merging vehicles, the one or more upstream mainline vehicles, and the one or more downstream mainline vehicles specifies one or more of a vehicle location, a vehicle speed, and an acceleration pattern associated with the vehicle, and the segment traffic data of each road segment among the on-ramp segment, the upstream freeway segment, and the downstream freeway segment specifies one or more of a traffic flow, a vehicle density, an average vehicle speed, and an average following distance associated with the road segment.

9. A system comprising:

one or more processors;

one or more memories storing instructions that, when executed by the one or more processors, cause the system to:

receive a first image set depicting a merging zone, the first image set including one or more first images associated with a first timestamp;

determine, using a trained first machine learning logic, a first state describing a traffic condition of the merging zone at the first timestamp using the first image set;

determine, from a sequence of states describing the traffic condition of the merging zone at a sequence of timestamps, using a trained second machine learning logic, one or more second states associated with one or more second timestamps prior to the first timestamp of the first state using a trained backward time distance;

compute, using a trained third machine learning logic, one or more impact metrics for one or more merging actions using the first state, the one or more second states, and the one or more merging actions;

select, from the one or more merging actions, a first merging action based on the one or more impact metrics; and provide a merging instruction including the first merging action to a merging vehicle, the merging instruction instructing the merging vehicle to perform the first merging action in the merging zone.

10. The system of claim 9, wherein the one or more second states includes a plurality of second states, and to determine the one or more second states from the sequence of states includes:

determining a past time range based on the first timestamp of the first state and the trained backward time distance; and determining, from the sequence of states, the plurality of second states associated with a plurality of second timestamps within the past time range.

11. The system of claim 9, wherein the one or more merging actions include one or more speed adjustments to one or more target merging speeds, one or more acceleration adjustments to one or more target acceleration rates, and one or more angle adjustments to one or more target steering angles.

12. The system of claim 9, wherein the instructions, when executed by the one or more processors, further cause the system to:

process, using a control unit of the merging vehicle, the merging instruction including the first merging action; and control, using the control unit of the merging vehicle, the merging vehicle to perform the first merging action in the merging zone.

13. The system of claim 9, wherein the merging zone includes an on-ramp segment, a upstream freeway segment, and a downstream freeway segment, and the first image set includes the one or more first images associated with the first timestamp received from one or more road side units located in the merging zone, one or more merging vehicles located on the on-ramp segment, one or more upstream mainline vehicles located on the upstream freeway segment, and one or more downstream mainline vehicles located on the downstream freeway segment.

14. The system of claim 9, wherein the merging zone includes an on-ramp segment, a upstream freeway segment, and a downstream freeway segment, the instructions, when executed by the one or more processors, further cause the system to determine, using the trained first machine learning logic, each state in the sequence of states associated with a corresponding timestamp in the sequence of timestamps using an image set associated with the corresponding timestamp, and the image set includes one or more images associated with the corresponding timestamp received from one or more road side units located in the merging zone, one or more merging vehicles located on the on-ramp segment, one or more upstream mainline vehicles located on the upstream freeway segment, and one or more downstream mainline vehicles located on the downstream freeway segment.

15. The system of claim 9, wherein each state in the sequence of states and the first state includes roadway data describing one or more roadway components of the merging zone, first vehicle movement data of one or more merging vehicles, second vehicle movement data of one or more upstream mainline vehicles, and third vehicle movement data of one or more downstream mainline vehicles, and first segment traffic data of an on-ramp segment, second segment traffic data of a upstream freeway segment, and third segment traffic data of a downstream freeway segment.

16. The system of claim 15, wherein the vehicle movement data of each vehicle included in the one or more merging vehicles, the one or more upstream mainline vehicles, and the one or more downstream mainline vehicles specifies one or more of a vehicle location, a vehicle speed, and an acceleration pattern associated with the vehicle, and the segment traffic data of each road segment among the on-ramp segment, the upstream freeway segment, and the downstream freeway segment specifies one or more of a traffic flow, a vehicle density, an average vehicle speed, and an average following distance associated with the road segment.

\* \* \* \* \*